(No Model.)

I. MARKS.
MECHANISM FOR TRANSFERRING PATTERNS.

No. 361,431. Patented Apr. 19, 1887.

WITNESSES:

INVENTOR:
I. Marks
BY Munn & Co.
ATTORNEYS.

UNITED STATES PATENT OFFICE.

ISAAC MARKS, OF NEW YORK, N. Y.

MECHANISM FOR TRANSFERRING PATTERNS.

SPECIFICATION forming part of Letters Patent No. 361,431, dated April 19, 1887.

Application filed December 10, 1886. Serial No. 221,188. (No model.)

*To all whom it may concern:*

Be it known that I, ISAAC MARKS, of the city, county, and State of New York, have invented a new and useful Improvement in Mechanisms for Transferring Patterns, of which the following is a full, clear, and exact description.

This invention pertains to an improvement in transferring patterns, having for its object to effect the ready or speedy transfer of an outline-pattern of a garment to the cloth or material from which the same is to be made.

The invention will be hereinafter described in connection with the drawings, and specifically pointed out in the claim.

Reference is to be had to the accompanying drawings, forming a part of this specification, in which similar letters of reference indicate corresponding parts in all the figures.

Figure 1:
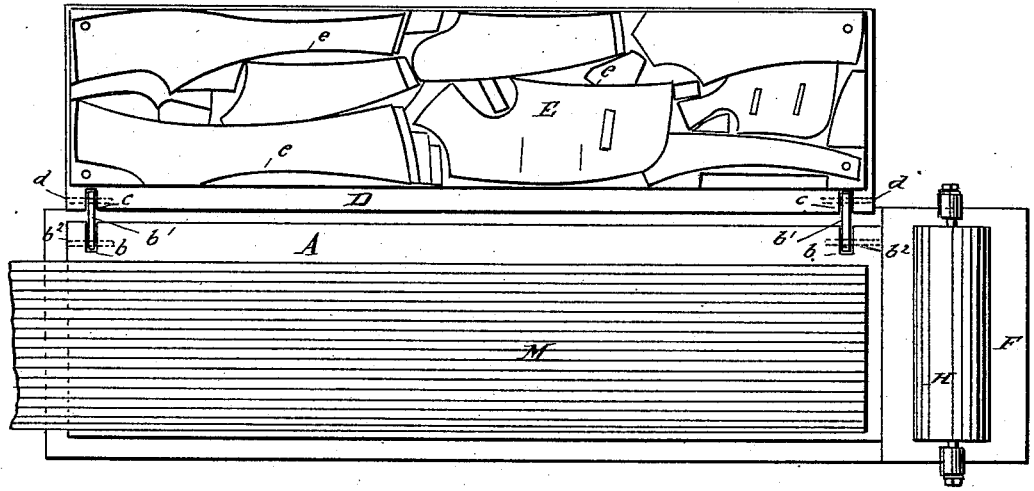
Figure 2:
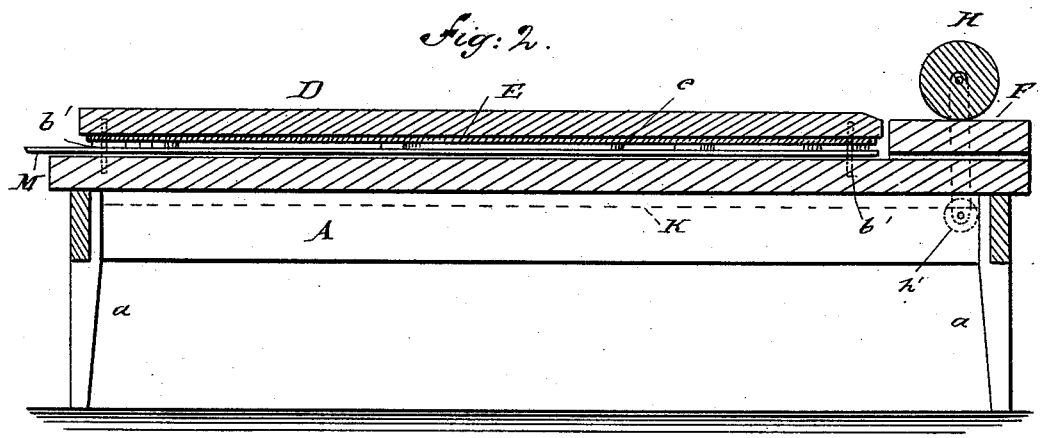
Figure 3:
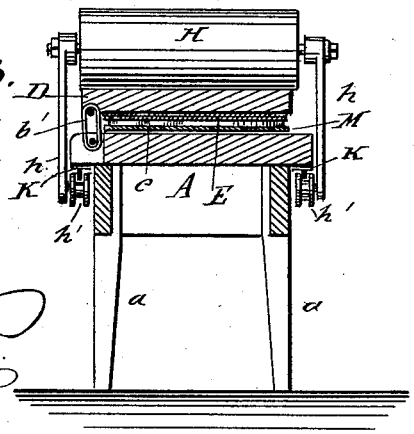

Figure 1 is a plan view of the apparatus employed in transferring patterns, with the pattern-board attached and thrown up; and Fig. 2 is a central longitudinal section through the same when in position to transfer. Fig. 3 is a central transverse section thereof; and Fig. 4 is a portion of the pattern-board, illustrating the embossment of the patterns thereon.

A represents an ordinary cutting-table, supported usually by legs a, one longitudinal edge of which table, near the ends thereof, is provided with recesses b, adapted to receive a link, b', held therein by a pin, b², or in any other suitable manner, the other end of the link b' being entered in recesses c, formed near the ends of a leaf, D, by a pin, d, or otherwise. The recesses in the leaf D are made in the same plane with the recesses in the table A, and the said leaf may be made the same width, or nearly so, of the table, but of less length.

I now provide a pattern-board, E, in the construction of which a thin board or other suitable substance is employed, of a width equal to the width of cloth, having embossed thereon a pattern of a complete garment, the various parts of said pattern being so arranged with relation to each other as that little waste is effected in cutting out the same. In producing the embossed surface, as shown in Fig. 4, I ordinarily use metallic strips e, securing said strips to the boards by nail-points or screws attached thereto, or in any other equivalent manner, the said strips being made to represent in outline the various portions of a garment, and, as above stated, the complete board to represent in outline a complete garment of a certain size and style of cut.

Figure 4:
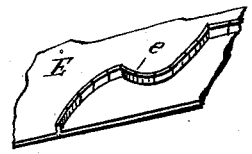

Instead of the metallic strips e, a straight wire or strip of rubber or other similar material may be used, the prime object being to produce a complete pattern in embossed outline, as represented in Figs. 1 and 4.

The pattern-board is adapted to be secured detachably to the under face of the leaf D, as shown in Fig. 1, by screws or in any other approved manner, whereby the operator may be enabled to quickly and readily replace one pattern-board carrying a pattern of a given size and style with another of a different size and style, as and when desired.

At one end of the table upon the top I secure a block, F, of the width of the said table and of a height equal to the combined thickness of the leaf D and the pattern-board E, the object of the said block being to support when not in use a heavy roller, H, having attached to its axis at each end vertical downwardly-projecting bars h, provided with flanged wheels h', journaled upon the inner faces of said bars, at the lower ends thereof.

To the under side of the table A, longitudinally the same near the edge, a track, K, is attached, upon which track the flanged wheels h' are adapted to travel, the roller being held a distance from the edge of the table by the flanged wheels engaging the track K.

In operation, after the desired pattern has been secured in position to the leaf D, the cloth M, or fabric from which the garment is to be cut, is placed smoothly upon the table A. By means of a roller, cloth, or brush, the embossed surface of the pattern-board E is now covered with chalk or any marking material, and the leaf, with its attached pattern-board, carried over upon the face of the cloth M, the link-hinge admitting vertical play of the said leaf and pattern-board.

By passing the heavy roller H over the upper surface of the leaf D a perfect impression or transfer of the pattern representing an entire garment is made upon the cloth. The roller may then be carried back, the leaf raised, and the cloth moved along, the same passing through a passage in the block F, whereupon the operation is repeated, and so on indefinitely.

The width of the pattern-board is usually made to conform to the usual width of the cloth, as the invention is specially designed for transferring patterns of clothing.

Having thus fully described my invention, what I claim as new, and desire to secure by Letters Patent, is—

The combination, with a bed and a leaf hinged thereto to fold thereon, having embossed upon its inner face in outline the various parts of a complete garment, of a roller having guide-wheels attached thereto adapted to travel upon a track attached beneath the bed, substantially as shown and described, and for the purpose herein set forth.

ISAAC MARKS.

Witnesses:
J. F. ACKER, Jr.,
E. M. CLARK.